United States Patent [19]
Coulter et al.

[11] Patent Number: 5,954,576
[45] Date of Patent: Sep. 21, 1999

[54] COIN HOPPER WITH PREVENTIVE FILL DETECTOR AND AUTOMATIC INVENTORYING

[75] Inventors: Gary L. Coulter, Henderson; Peter Filiberti, Las Vegas, both of Nev.

[73] Assignee: Spinteknology, Inc., Las Vegas, Nev.

[21] Appl. No.: 08/925,780

[22] Filed: Sep. 9, 1997

Related U.S. Application Data

[63] Continuation-in-part of application No. 08/586,513, Jan. 16, 1996, Pat. No. 5,819,901, which is a continuation-in-part of application No. 08/414,238, Mar. 31, 1995
[60] Provisional application No. 60/005,312, Oct. 16, 1995.
[51] Int. Cl.⁶ .................... G07D 9/00; G07D 1/00; G06F 7/00; G01G 19/42
[52] U.S. Cl. ................ 453/17; 453/32; 194/217; 177/25.17; 340/825.35
[58] Field of Search ................ 453/17, 32; 194/200, 194/202, 217; 177/25.17; 340/666, 825.35; 364/412

[56] References Cited

U.S. PATENT DOCUMENTS

| | | |
|---|---|---|
| 3,552,511 | 1/1971 | Flanders et al. ............. 177/25.17 |
| 3,789,202 | 1/1974 | Yamanaka . |
| 4,219,089 | 8/1980 | Gard et al. . |
| 4,238,127 | 12/1980 | Lucero et al. . |
| 4,283,709 | 8/1981 | Lucero et al. . |
| 4,382,527 | 5/1983 | Lerner . |
| 4,396,078 | 8/1983 | Minamida et al. ........... 177/25.17 |
| 4,447,885 | 5/1984 | Biss . |
| 4,512,428 | 4/1985 | Bullivant . |
| 4,522,275 | 6/1985 | Anderson . |
| 4,646,767 | 3/1987 | Hikita . |
| 4,795,155 | 1/1989 | Grande . |
| 5,046,989 | 9/1991 | Dass . |
| 5,056,643 | 10/1991 | Kirberg . |
| 5,123,494 | 6/1992 | Schneider . |
| 5,193,629 | 3/1993 | Lare . |
| 5,199,517 | 4/1993 | Kirby . |
| 5,366,407 | 11/1994 | Sentoku ..................... 453/32 |
| 5,429,361 | 7/1995 | Raven et al. . |
| 5,477,952 | 12/1995 | Castellano et al. . |
| 5,496,032 | 3/1996 | Okada ....................... 453/17 |
| 5,531,309 | 7/1996 | Kloss et al. . |
| 5,735,379 | 4/1998 | Schulze et al. .............. 453/17 |

FOREIGN PATENT DOCUMENTS

| | | |
|---|---|---|
| 39 02 085 A1 | 7/1990 | Germany . |
| 41 40 451 A1 | 6/1993 | Germany . |
| 2 221 315 | 1/1990 | United Kingdom . |
| 2 272 383 | 5/1994 | United Kingdom . |

OTHER PUBLICATIONS

W. W. Grainger, Inc. Catalog, pp. 893 Mar. 1995.
"Intelligent DPM Provides PC Software," *Electronic Products*, Jan. 1986, p. 112.
"Acquisition Module Links to Serial Port," *Electronic Products*, Jan. 1986, p. 113.

(List continued on next page.)

*Primary Examiner*—Christopher P. Ellis
*Assistant Examiner*—Bryan Jaketic
*Attorney, Agent, or Firm*—Townsend and Townsend and Crew

[57] ABSTRACT

The present invention provides a weighing apparatus for weighing coins accumulated in a coin hopper using a load cell and automatically taking periodic readings of the number of coins accumulated in the hopper. By periodically monitoring the hopper and automatically calculating the number of coins in the hopper, preventive fills and automatic inventorying can be effected. Knowing the coin count and being able to transmit coin counts to a central location allows for central accounting. Monitoring the coin count locally or centrally allows for "preemptive fills" where a hopper running low on coins is filled during periods of inactivity prior to the hopper being completely empty. The number of coins in the hopper at any given time is determined from the combined weight of the hopper and the coins accumulated in the hopper.

4 Claims, 8 Drawing Sheets

OTHER PUBLICATIONS

"Digital Transmitters and Data Acquisition Software—D1000 and D2000 Omegabus® System," product literature, p. c–41 Jan. 1996.

"Little G™: The Smart Controller!," *Electronic Products,* Feb. 1996, p. 146.

*Magnum Opus —Custom Electronic Engineering* Catalog, (EEM 1996), pp. 7, 2025.

W.W. Grainger, Inc. Catalog (#378), p. 895 Mar. 1990.

*Thomas Register 1995,* pp. SCA/27964–27945 Jan. 1995.

*Packaging Machinery Directory 1995–1995,* pp. 290–291, 293–294 Nov. 1994.

"Triangle Selectacom 360/18—The Jumbo Masters of Big Piece, Large Volume Weighing," product literature, 8 pp. Jun. 1992.

"Triangle Selectacom 360/14 Computer Combination Scale—The Racing Radial." product literature, 6 pp. Jun. 1992.

"Triangle Selectacom 360/10 of Big–Piece to Flowable Large Volume fast Weighing—The Jumbo Masters," products literature, 4 pp. Jun. 1992.

"Triangle Selectacom SPD The Rapid Transit in Computer Weighing," product literature, 6 pp. Jun. 1992.

"Triangle Acceleron—The Freedom Machines of Form–Fill–Seal," product literature, 6 pp. Jul. 1994.

"Triangle Acceleron Advantage—Easily the simplest VFFS to run, service, clean ad changeover," product literature, 8 pp. Jan. 1995.

"Tridyne Process Systems," product literature, 5 pp. Oct. 1993.

"Tridyne Process Systems, Model F–98" product literature, 2 pp. Oct. 1993.

"Tridyne Process Systems, Model F–98–6000" product literature, 2 pp. Oct. 1993.

"Tridyne Process Systems, Model 1650," product literature, 2 pp. Oct. 1993.

"Tridyne Process Systems, Model F–108," product literature, 2 pp. Oct. 1993.

"Tridyne Process Systems, Model DF–98–SH" product literature, 2 pp. Oct. 1993.

"Tridyne Process Systems, Model 600" product literature, 2 pp. Oct. 1993.

"Tridyne Process Systems, Model 2000 or 200" product literature, 1 pp. Oct. 1993.

"Tridyne Process Systems," product literature, product applications, customer list 3 pp. Oct. 1993.

COIN HOPPER WITH PREVENTIVE FILL DETECTOR AND AUTOMATIC INVENTORYING

CROSS REFERENCE TO RELATED APPLICATIONS

This application is a continuation-in-part of U.S. application Ser. No. 08/586,513, filed Jan. 16, 1996, now U.S. Pat. No. 5,819,901, which was a continuation-in-part of application Ser. No. 08/414,238, filed Mar. 31, 1995, and claims priority from U.S. Provisional patent application Ser. No. 60/005,312, filed Oct. 16, 1995, all of which are incorporated herein by reference for all purposes.

TECHNICAL FIELD OF THE INVENTION

The present invention relates to hoppers used to collect and distribute coins in gaming amusement and vending machines. More particularly, the present invention relates to a coin hopper which alerts an operator the need for preventive fill and performs automatic inventory of coins in the coin hopper.

BACKGROUND OF THE INVENTION

Prior art systems found in many casinos subject to continuous (24 hour a day, seven day a week) operation have the disadvantage that they must be taken out of service to refill hoppers when the hoppers run low on coins. Machines might also be taken out of service to perform any necessary periodic accounting. In some jurisdictions, the coin inventory in each machine must be taken at regular intervals. Because the revenue generated by a machine is related to the amount of time it is being played, taking a machine out of service when it is being played, especially when the current player is non a "hot streak", results in loss of revenue.

Another problem with previous slot machines is that because casinos deal with large amounts of cash, they are subject to theft by dishonest persons and are particularly vulnerable to theft by dishonest employees. If so inclined, a dishonest technician can take a few coins from each casino slot machine as it is serviced. Although the shortages over time multiplied by many technicians can be quite large, since each individual take is so small, casinos have resigned themselves to being shorted and treat the thefts as a cost of doing business. Casinos have tried to combat this problem by assigning two or more technicians to each task requiring an open gaming machine. However, this leads to additional labor costs and doesn't help if each of the assigned technicians is dishonest.

An alternate solution is to seal the coin or bill reservoir so that only trusted money-handling employees working in a cashier's cage can get to the coins or bills. Coin hoppers are more difficult to seal than bill acceptors because coin hoppers have to give out coins as well as receive them, whereas bill acceptors simply store the bills, and because coins are more likely to jam a hopper than pliable bills. If jamming was not a concern, then the hoppers could be sealed. However, where jamming is a possibility, sealing the hoppers might result in greater down-time for the gaming machines, which is a loss to the casinos which can be greater than the theft loss.

The hopper must be occasionally opened to refill with coins after a jackpot is hit and thus is not readily amenable to being sealed. Even if the hopper were sealed, it would not prevent a coin loader from removing some coins from the load of coins being added to the hopper.

As should be apparent after reading the above, merely counting coins as they go into the hopper and counting coins as they leave the hopper would not prevent theft, as a physical inventory would only indicate that coins are missing, not who took them.

Prior art systems exist for weighing coins to count the coins, and many such devices might be used in a money room of a casino. For example, U.S. Pat. No. 5,193,629 issued to Lare and U.S. Pat. No. 4,512,428 issued to Bullivant describe apparatus for weighing coins. While such weighing devices might be suitable for weighing coins in a money room, it is unsuitable in a gaming machine environment, where the hoppers must be enclosed to prevent theft by players, as well as being remotely accessible, operable in an electrically noisy and vibration-prone environment and able to detect theft at the time of the theft.

From the above it is seen that an improved method and apparatus for filling hoppers, coin accounting and theft prevention is needed.

SUMMARY OF THE INVENTION

The present invention provides a weighing apparatus for weighing coins accumulated in a coin hopper using a load cell and automatically taking periodic readings of the number of coins accumulated in the hopper. By periodically monitoring the hopper and automatically calculating the number of coins in the hopper, the need for preventive fills can be easily and timely detected.

In one application of a coin hopper according to the present invention, each machine having such a coin hopper is coupled to an electronic data collection network, which provides coin counts for a plurality of machines at a centralized location. Preferably, a human or computer program monitors coin levels in the plurality of machines to allow for simple and quick accounting of coin inventories, thereby allowing a casino to easily and quickly comply with regulatory requirements and the casino's business accounting requirements.

Additionally, the central monitoring system allows for "preemptive fills" where the monitor is alerted to machines which have hoppers low on coins and are not being played. Using preemptive fills, hoppers can be filled without interfering with customers' desires to play the machines. Preemptive fills can be signalled at a central location using the network or can be signalled at each individual machine, in which case a visual inspection of the machine may be all that is required to determine if the machine is in play.

A further understanding of the nature and advantages of the inventions herein may be realized by reference to the remaining portions of the specification and the attached drawings.

DESCRIPTION OF THE PREFERRED EMBODIMENTS

The preferred embodiments described below allow for the coins in the coin hopper to be counted electronically by weight. This allows for automatic inventorying of the coins, theft detection and allows for preemptive fills. If a gaming machine's hopper runs empty, there will likely be a player at the machine having just won a payout. Consequently, the player may be on a "hot streak" and want to keep playing that particular machine. If the casino must take the machine out of service to refill the hopper, this results in lost operating time (which often translates into lost revenue for the casino), additional labor costs, and possibly the loss of the current customer playing the machine. For these and other reasons, the hopper provides a "preemptive fill" signal or a count/weight which allows a game controller to generate the preemptive fill signal. The signal is asserted automatically when a hopper is running low on coins.

In a specific embodiment, when a condition is detected where a hopper has less than a threshold number of coins and the machine is inactive (i.e., no player is at the machine), a monitor is alerted to the event. If the alert is a local alert, a technician noticing the alert at an inactive machine will fill the hopper. If the alert is a central alert and the inactivity of the machine is detected, a technician will be dispatched to the machine to fill the hopper while the machine is not being played and before the hopper runs out of coins.

Figure 1:
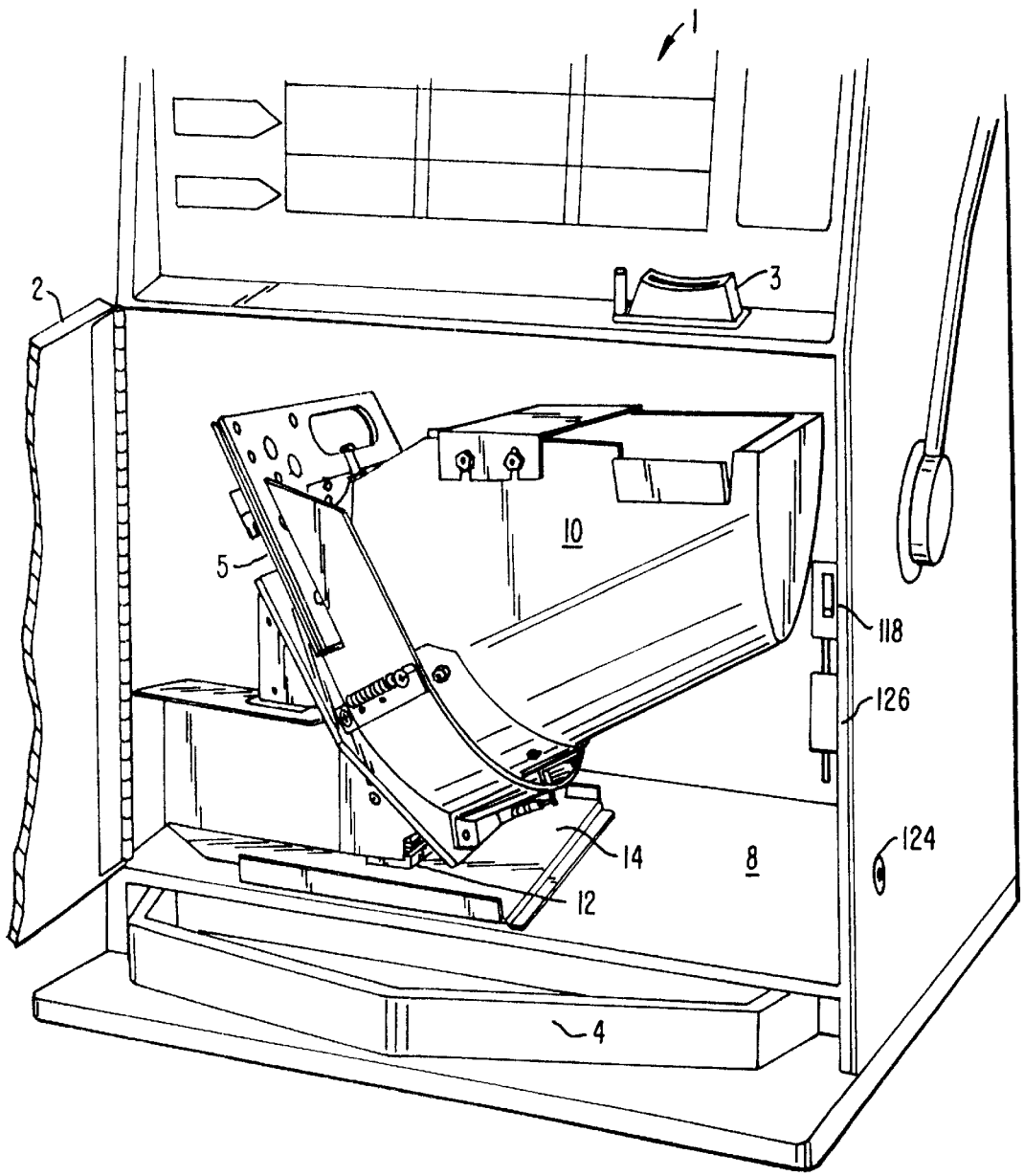
FIG. 1 is a front view of a slot machine with its door open showing a coin hopper.

FIG. 1 illustrates how a coin hopper 10 is often mounted in a slot machine 1. To show the placement of the hopper, a hopper door 2 of slot machine 1 has been opened. During operation, the hopper door 2 would usually be locked shut to prevent theft of coins by players. As shown here, hopper 10 is often placed below a coin insertion slot 3 and above a coin payout tray 4. To initiate play of a game, a player would insert one or more coins into coin insertion slot 3 and those coins would drop into hopper 10. Although not shown in FIG. 1, the coins would typically pass through a coin handling unit on their way to hopper 10, where the coin handling unit performs tests (size, weight, angular moment, etc.) to determine if the coin is real and of the proper denomination. The coin handling unit, or other device, would provide a signal, such as an electric "coin in" pulse, to a logic board to signal that a valid coin has been inserted. If a game is a winning game, or the player cashes out his or her credits with slot machine 1, hopper 10 ejects the correct amount of coins from ejection slot 5 into payout tray 4. In some embodiments, such as so-called "slant-top" slot machines, the hopper is actually located below the payout tray and an "elevator" or "escalator" mechanism is used to raise the paid out coins higher to a payout tray on the top surface of the same so that the coins will fall into the payout tray, and thus be accessible to the player.

Typically, a motorized conveyor assembly (not shown) of hopper 10 causes coins to be ejected to the payout tray or elevator and that conveyor assembly runs until a "coin out" counter signals that the correct number of coins have been ejected. Thus, thefts can be detected by taking an initial manual inventory of the coins in hopper 10, then tracking the "coin in" and "coin out" pulses and taking a closing inventory. However, this process requires two manual inventory steps, does not detect who took the missing coins or when, and doesn't account for coins which are misfed into or out of hopper 10 and fall into other areas inside slot machine 1, such as area 8. To solve these problems, an electronic weight sensor, specifically a load cell 12, is provided as shown in FIG. 2.

Figure 2:
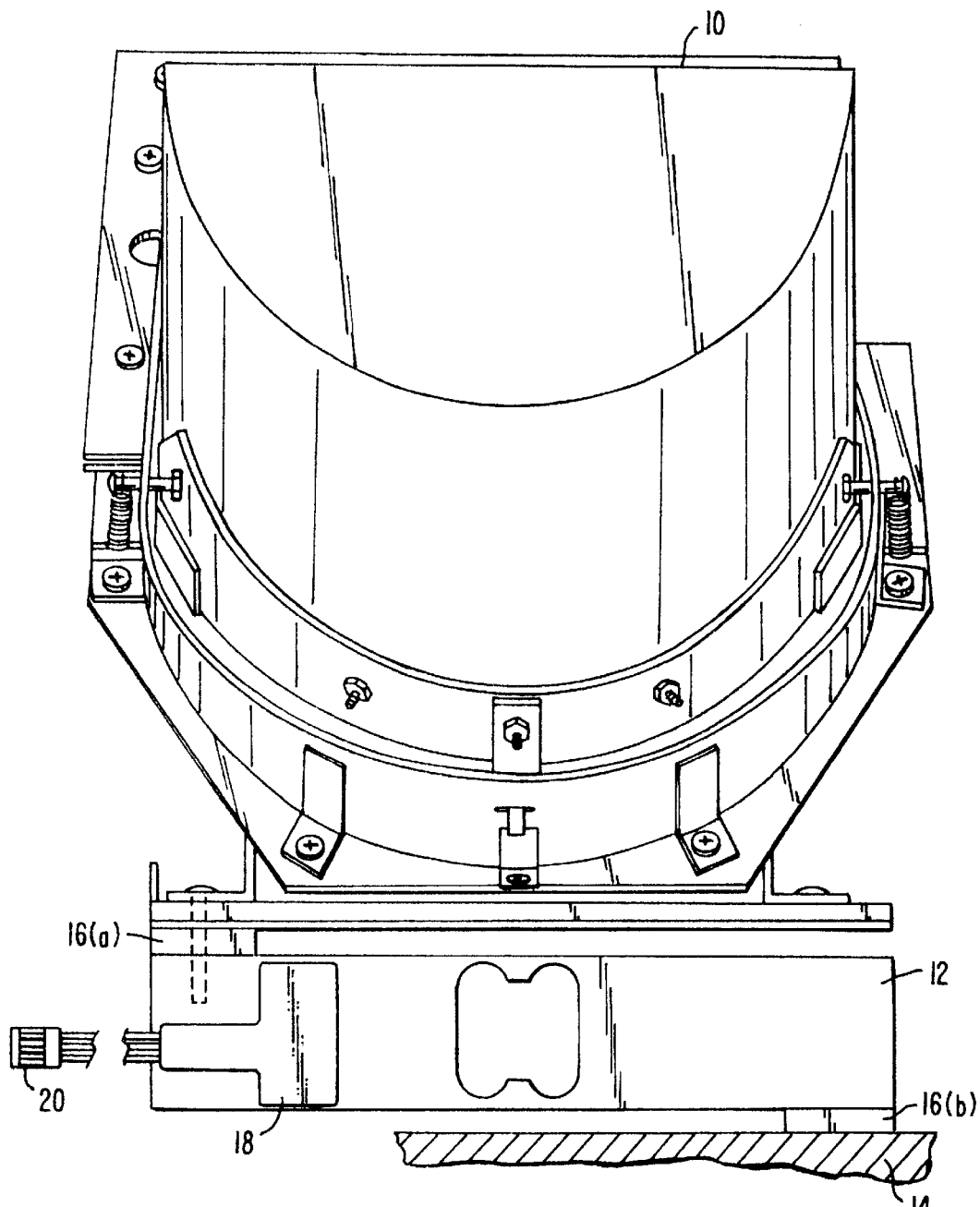
FIG. 2 is a more detailed side view of the coin hopper shown in FIG. 1 illustrating the cantilevered mounting of the hopper on the load cell.

FIG. 2 illustrates the mounting of hopper 10 onto a base 14 of slot machine 1 using load cell 12 and cantilever spacers 16. Hopper 10 and the coins therein are totally supported by cantilever spacer 16(a), which is in turn totally supported by load cell 12, which is turn totally supported by cantilever spacer 16(b) mounted directly to base 14. Thus, the weight of the hopper and the coins therein is applied to load cell 12 causing a strain on load cell 12 which is a function of the weight of the hopper and coins therein. That strain is measured by a strain gauge 18 and the strain can be measured by reading electrical signals on the lines of cabling 20.

Figure 3:
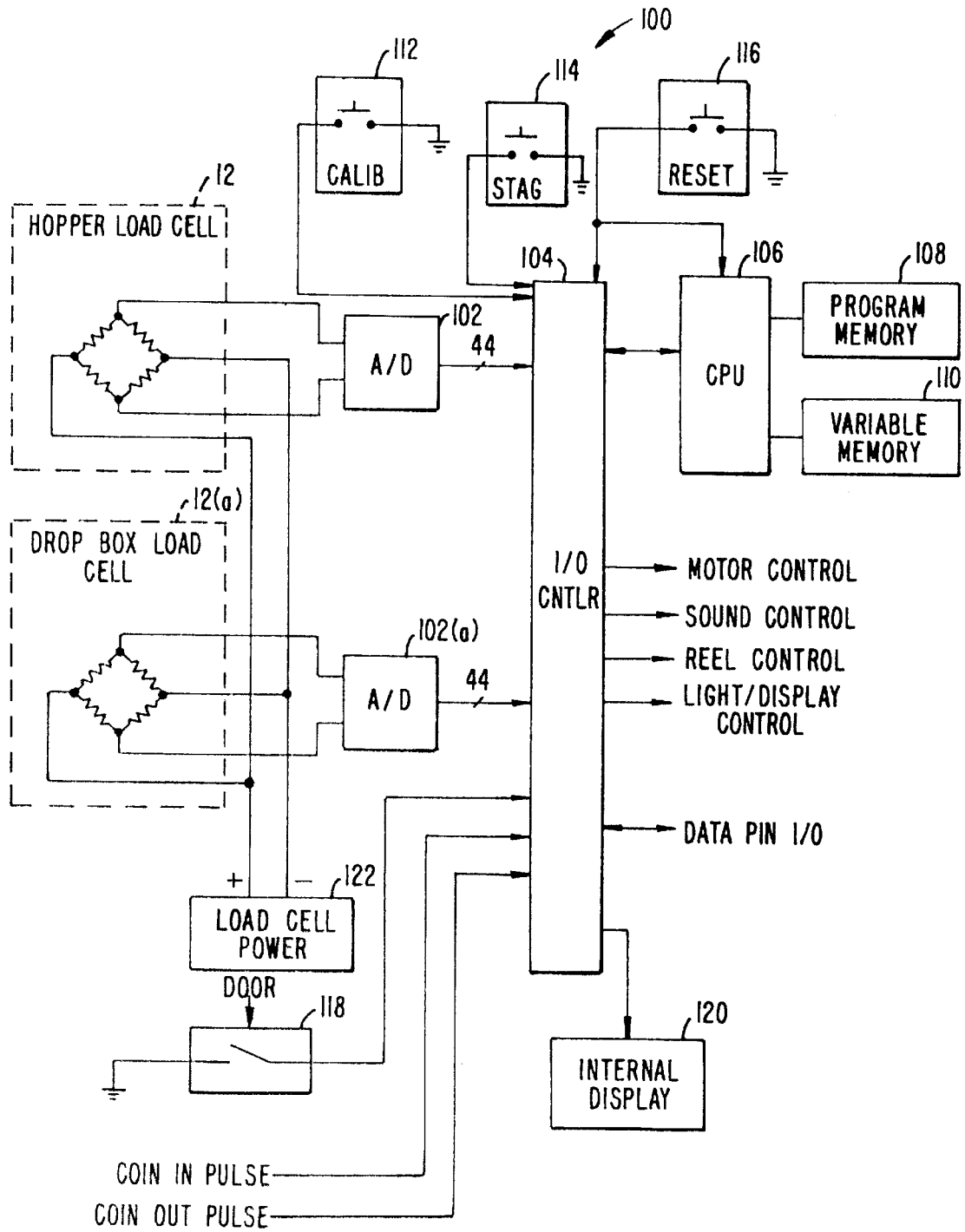
FIG. 3 is a schematic diagram of the electronics of the coin hopper and accounting system shown in FIG. 2.

Referring now to FIG. 3, a schematic of a logic board 100 used in an embodiment of the present invention is shown. In an alternative embodiment, the role of the logic board is subsumed into a central slot machine control system. The logic board comprises an analog-to-digital converter (ADC) 102 coupled to load cell 12 to convert a load signal from an analog signal to a digital load cell sample. As shown, the digital load cell sample has a resolution of 14 bits (hence the 14 signal lines carrying the signal in parallel), but other resolution A/D converters can also be used. With 14 bits, an integer corresponding to the digital load cell sample can range from 0 to 16,383. With proper calibration and proper selection of load cell 12, a fully loaded hopper will cause a reading near the top end of the range, so as to have the best resolution.

ADC 102 provides its output to an input-output (I/O) controller 104 which in turn provides samples, as requested, to a central processing unit (CPU) 106. CPU 106 executes programs stored in program memory 108 and uses a variable memory 110 to store data incident to the execution of those programs. The programs executed by CPU 106 comprise instructions for following the processes described in FIGS. 4-8, however CPU 106 might also execute other programs not described herein. In some embodiments, a CPU with built-in I/O control functions and/or memory might be used, however the description of FIG. 3 still applies to such integrated systems.

FIG. 3 shows a number of I/O signals being provided to, or by, I/O controller 104. For example, "Coin In" and "Coin Out" signals are provided from coin handling devices. These signals can be pulses (one pulse per coin) or can be other signals indicating a count, as are well known in the art. I/O controller 104 might also provide motor, sound, reel, lights and display control signals, if CPU 106 or I/O controller 104 are programmed to handle such functions of slot machine 1. I/O controller 104 receives switch signals from a variety of sources, of which a calibration switch 112, a start switch 114, a reset switch 116 and a door switch 118 are shown. FIG. 3 also shows an internal display 120 which is used as explained below.

Also shown in FIG. 3 is a drop box load cell 12(a) and an ADC 102(a) coupled to I/O controller 104. Drop box load cell 12(a) performs a function similar to load cell 12, in that it provides an indication of the weight of a drop box (not shown) and the coins therein. A drop box is a standard part of some slot machines, and is used to contain the overflow of coins from a hopper. For example, in FIG. 1, a drop box might have been installed below hopper 10. A drop box is similar to a hopper, in that it holds a collection of coins, but differs from a hopper in that coins are not ejected from the drop box. If a drop box is used, a hopper may have a sensor which detects when the hopper is full (or could use the present invention to determine if more than a threshold number of coins are in the hopper), and ejects coins in such as way that the ejected coins fall into the drop box instead of into payout tray 4. Of course, load cell 12(a) and ADC 102(a) are not needed where coin accounting for drop box coins is done separately or the drop box is not used.

I/O controller 104 also reads/writes data from a data pin 124 (see FIG. 1) as explained below. In a preferred embodiment, data pin 124 is part of a communication system manufactured by Dallas Semiconductor. A data wand (not shown) is a hand-held, battery-powered device with an internal computer which communicates with I/O controller 104 through a single signal line and chassis ground connection.

In operation, load cells 12, 12(a) are provided with load cell power from a load cell power source 122 and generate an analog voltage which is a function of their load, which analog voltage is input to the load cell's ADC 102 or 102(a). In operation, the states of the various switches shown in FIG. 3 are monitored, as explained in connection with FIG. 4.

Figure 4:
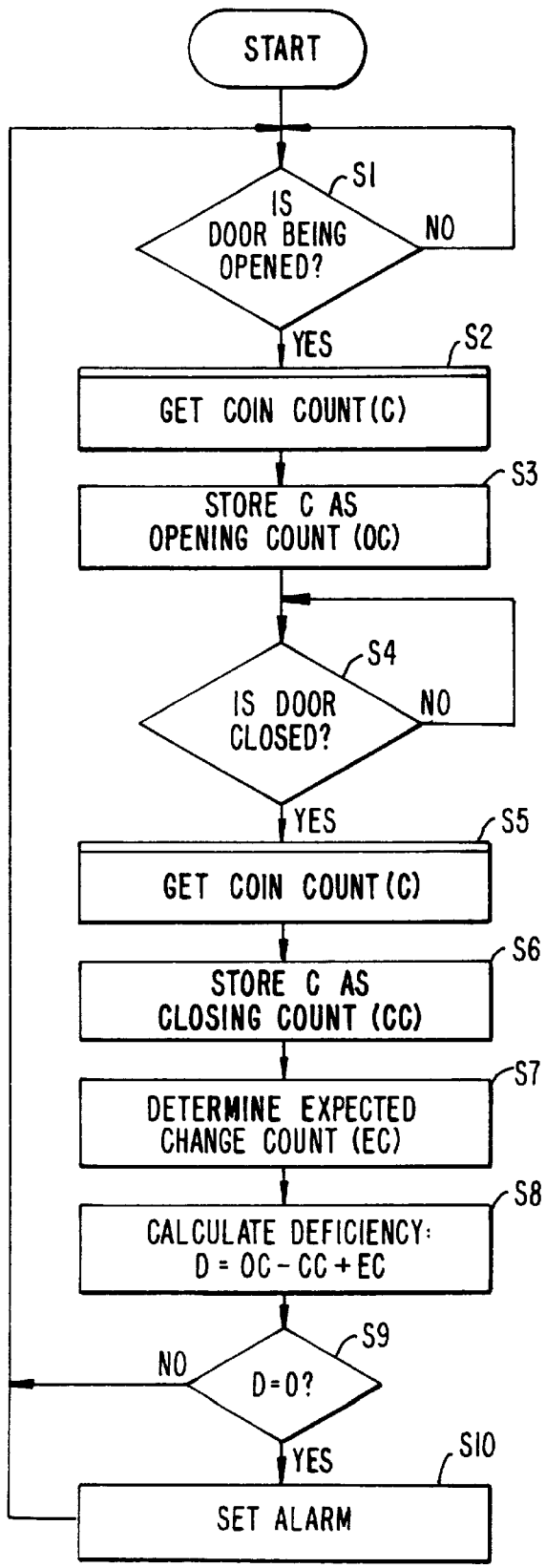
FIG. 4 is a flowchart of an accounting process for accounting for coins in a coin hopper such that theft is timely detected.

FIG. 4 is a flowchart of a process for timely detecting unauthorized coin removal as performed by CPU 106 according to instructions stored in program memory 108. Each step in FIGS. 4–8 is numbered with a step number and the step numbers within each figure follow in sequential order of execution of the steps, except where noted.

The process shown in FIG. 4 begins when hopper door 2 (see FIG. 1) is opened (S1). This process assumes that the primary mode of coin theft is from dishonest technicians or other casino employees opening slot machine door 2 to perform actual or purported maintenance and taking coins from hopper 10 while hopper door 2 is open. Presumably, a game cannot be played and a payout cannot be made while door 2 is open and therefore a coin count should not change except in cases of authorized coin withdrawal. In a preferred embodiment, hopper door 2 is secured by an electronic switch, such as a solenoid 12G (see FIG. 1), which can only be activated by the technician or employee touching their assigned data wand to data pin 124. As part of the opening process, CPU 106 records an employee ID communicated from the data wand before activating solenoid 126 to open hopper door 2. Alternatively, hopper door 2 can be opened by an ordinary key and the door opening can be detected by door switch 118. In either case, a preferred embodiment records the time of opening.

When hopper door 2 is being opened, or preferably just before access is granted or hopper door 2 moves, a coin count is obtained (S2) and the count is stored as the opening count (OC) (S3). If CPU 106 makes continuous, periodic readings, then the opening count might just be the most recent periodic reading before hopper door 2 was opened and after the last game was played.

At step S4, the door is monitored until it is closed, and another coin count is taken (S5). In a preferred embodiment, this second coin count is a reading taken after slot machine 1 has stabilized following the closing of the door. This coin count, C, is stored (S6) as the closing count (CC). Next (S7), an expected change count (EC) is determined. This expected change count is positive in the case where a technician is sent to a slot machine to add coins to a depleted hopper, is negative where the technician is sent to the slot machine to remove coins, and is zero where the technician is sent to the slot machine simply to perform maintenance. Of course, other variations of this scheme are also possible. For example, the expected change count might not be known at the time the coins are removed, but later determined after the technician turns over the coins removed from the slot machine.

If the expected change count is known at the time the door is closed, a deficiency can be easily calculated (S8), by subtracting the closing count (CC) from the opening count (OC) and adding the expected change count (EC). If the resulting deficiency (D) is not equal to zero (S9), then an alarm can be set (S10). Where the slot machine does not automatically determine the identification of the technician or other employee opening the slot machine, the setting of an alarm might result in a flashing light on the slot machine being immediately activated, so that the unauthorized removal of coins can be detected by a floor manager while the thief is still present at the machine. However, in a preferred embodiment, the slot machine detects the time of opening and closing as well as the identification of the person opening the machine, thereby allowing the deficiency to be easily traced to a specific employee. In an alternate embodiment, where the slot machine is not able to determine the identity of the person opening the slot machine, the slot machine will merely record the time of entry and the deficiency for later comparison to a log kept elsewhere showing which employees had access to which slot machines at which times. In a preferred embodiment, the alarm is not merely a local alarm in the form of a flashing light on the slot machine or the like, but is an alarm which is recorded by CPU 106 and is communicated to a central security station (not shown). Regardless of whether an alarm is set or not, the flow of the process returns to step S1, where it remains until the hopper door is again opened.

In a preferred embodiment, the slot machine activity is communicated to a central security station for easy monitoring and prompt detection of deficiencies. The automatic coin accounting process of FIG. 4 is a process which can be run independently of the coin counting processes shown elsewhere. The use of the present invention to handle other modes of theft or coin accounting should be apparent after reading this present description.

For example, the central security station can monitor the number of coins in each hopper of each slot machine coupled to the central security station to provide instantaneous accounting of the number of coins in a particular hopper or the number of coins present in all hoppers on an entire casino floor. This saves the casino from having to do labor-intensive physical inventories at each individual machine and avoids the need to interrupt a player's play where the casino is in continuous operation. As a further advantage, the use of central monitoring reduces the average down time for a machine by alerting the casino to the need for preemptive fill.

In one embodiment, a central station monitors coin levels in each slot machine and also monitors which slot machines are actively being played and which slot machines are inactive. If it is noted that a slot machine hopper has run low on coins and the slot machine is not being played at the time, a technician can be dispatched to add more coins to the hopper during this down time, without interfering with any player's desire to play a particular machine. This can be important in casinos which are in continuous operation and whose casino floor revenues are a function of the total amount of time each machine is played. Preemptive fills can also be important to the players. If a player feels that a particular machine is "hot" and the player consequently decides to continue playing the machine, the casino does not want to interfere with the player's play. However, when a machine is actually running "hot" and paying out successive wins, that is the point at which it is most likely to run low on coins. Of course, should a player win more than the number of coins available, a casino would pay the player from some other source of coins or bills, such as a cashier's cage. In general, casinos prefer to avoid such situations because they involve greater labor costs and interrupt the player's flow of game play.

Figure 5:
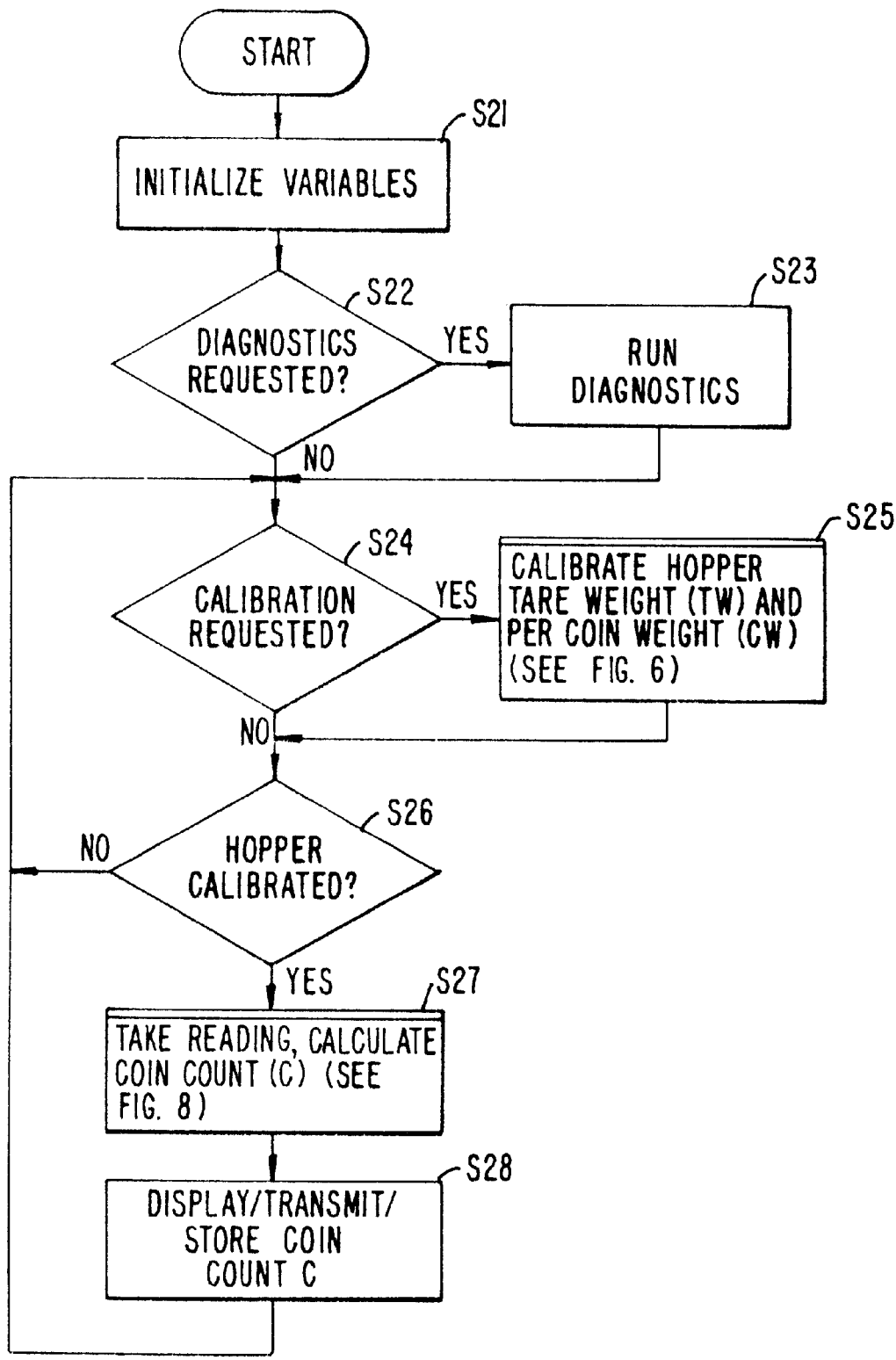
FIG. 5 is a flowchart of a process for automatically taking periodic measurements to determine a coin count of coins in the hopper.

While FIG. 4 shows a process of deficiency detection, FIG. 5 shows a more general process of taking a reading to calculate coin count C. In a preferred embodiment, the processes of FIG. 4 and the processes of FIG. 5 run asynchronously, with the process shown in FIG. 5 being a process of periodically taking a reading to update the current coin count and storing a new coin count whenever it is determined that a stable and reliable reading has been taken, while the process shown in FIG. 4 (more specifically steps S2 and S5) merely refers to the stored coin count value for the latest reliable coin count.

Referring now to FIG. 5, the process shown therein begins with an initialization of the variables used (S21). At this point, the operator is prompted with "START" or a similar prompt, prompting the operator to begin the calibration process. The prompt is displayed, in some embodiments, on a computer terminal, while in other embodiments it is displayed on an LED display 120 coupled to I/O controller 104 (see FIG. 3). Preferably, the operator first determines that the hopper and slot machine are stable and the hopper is empty.

At step S22, CPU 106 (see FIG. 3) determines whether diagnostics were requested by the operator. One embodiment, the operator signals that diagnostics are requested by sending a predetermined signal from a terminal to I/O controller 104 such as through the data pin I/O or by simultaneously pressing calibration button 112 and start button 114 (see FIG. 3). If diagnostics are requested, CPU 106 executes those diagnostics (S23) and proceeds to step S24. Otherwise, if diagnostics are not requested, CPU 106 proceeds directly to step S24.

At step S24, CPU 106 checks to see if the operator has requested a calibration. In the embodiment shown in FIG. 3, the operator requests calibration by pressing calibration button 112. If calibration is requested, the calibration process is executed (S25) to determine a tare weight (TW) and a per coin weight (CW). Following the calibration step, which is described in further detail in FIG. 6, or if calibration is not requested, CPU 106 proceeds to step S26, where it determines whether or not the hopper was calibrated. If the hopper was not calibrated, either because calibration was not requested or because the calibration step was not successful due to unreliable readings, CPU 106 returns to step S24, thus creating a loop that is only exited when the hopper is finally calibrated.

When the loop is exited, CPU 106 proceeds to step S27, where a reading of the hopper weight is taken and a coin count is calculated. This process is shown in further detail in FIG. 8. Once a reliable coin count is obtained (S28), that coin count is displayed, transmitted to a remote storage and/or display device or the coin count is simply stored in variable memory 110 (see FIG. 3), for later provision of a coin count value to other processes which use the coin count. Once the coin count is obtained and processed as described above, CPU 106 returns to step S24. Thus, while the hopper remains calibrated, CPU 106 executes a periodic loop of taking a reading, calculating a coin count, and providing the coin count to various display or memory devices as needed. In a preferred embodiment, a latest reliable value for the coin count is retained and is not overwritten by any subsequent unreliable coin counts, thereby providing a reliable coin count value which can be polled at any time by asynchronous processes.

Figure 6:
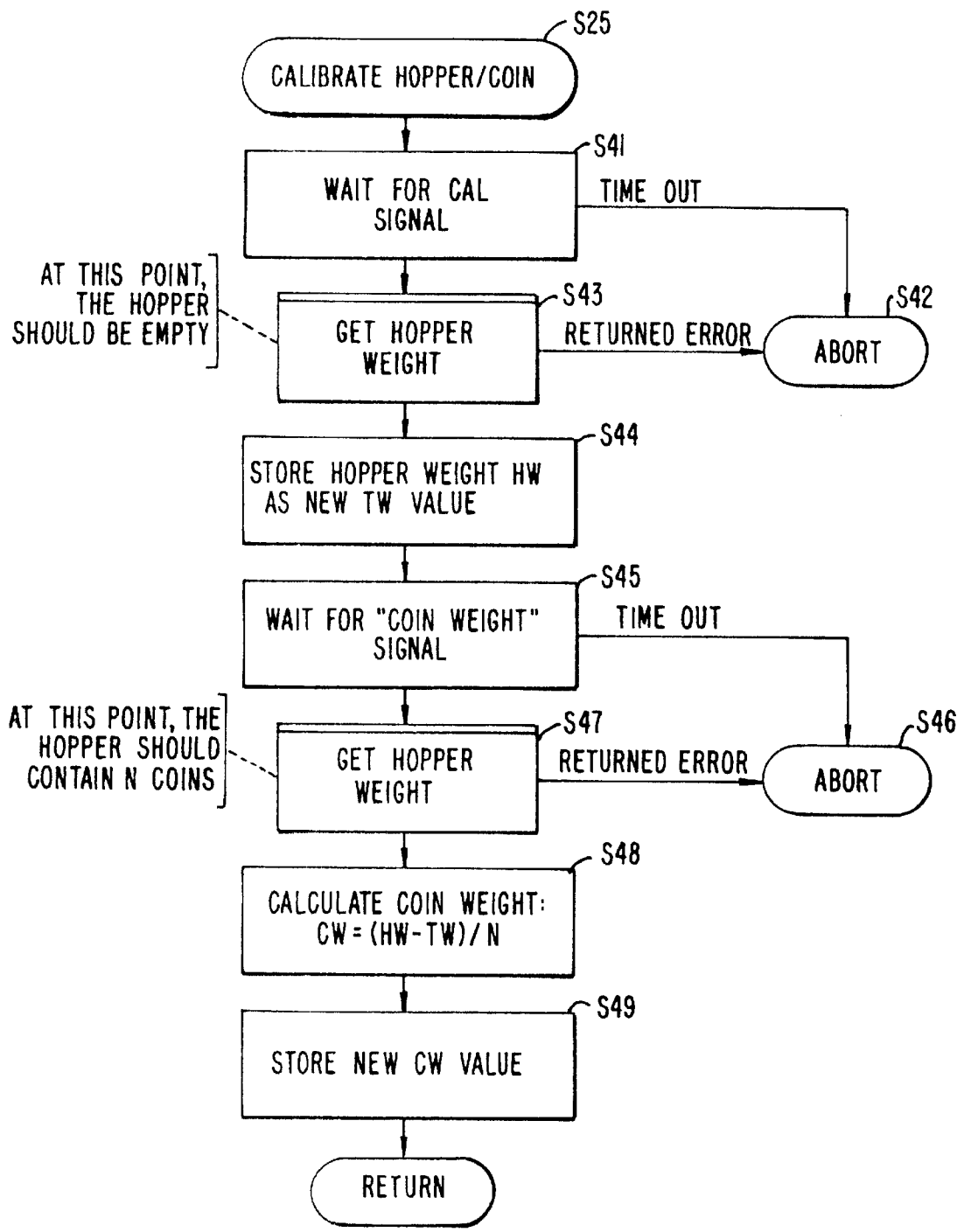
FIG. 6 is a flowchart of a process for calibrating a hopper's tare weight and a per coin weight.

FIG. 6 shows the calibration process of step S25 in further detail. At the outset of the calibration process, CPU 106 waits (S41) for a calibration signal, either from a remote device or from the operator pressing calibration switch 112. If the calibration signal is not received within a predetermined time, the calibration process is aborted and an indication that calibration did not complete is given so that readings (see FIG. 5) will not be taken until the calibration process actually successfully completes. If the calibration signal is received, CPU 106 proceeds to obtain the hopper weight (S43), which is described in further detail in FIG. 7. Prior to receipt of the calibration signal, the hopper should have been emptied by the operator so that a tare weight of the hopper can be obtained. Also, if the calibration signal is sent using calibration switch 112, CPU 106 delays for a predetermined time to allow for dampening of slot machine vibrations due to calibration switch 112 being pressed. If the hopper weighing process returns an error indicating that a reliable hopper weight cannot be obtained, CPU 106 aborts the calibration process (S42). However, if a reliable hopper weight is obtained, that hopper weight is stored as the new tare weight (TW) value for the hopper (S44).

Once the hopper tare weight is obtained, CPU 106 waits for a COIN WEIGHT signal (S45), and when the COIN WEIGHT signal is received, CPU 106 again measures the hopper weight (S47). Before the COIN WEIGHT signal is sent, the process expects that the hopper now contains N coins. In a preferred embodiment, N=20, however it should be apparent that other values of N could be used. If a time out occurs while waiting for the COIN WEIGHT signal or the hopper weighing process returns an error, the calibration process is aborted (S46) and only the tare weight is updated. Where a hopper is modified or moved to a different slot machine, the calibration procedure could be allowed to abort at step S46, without ill effects, since the prior per coin weight can be reused.

Once the hopper weight is obtained (S47) for the hopper and the N coins, a coin weight is calculated (S48) by subtracting the hopper tare weight (TW) from the just measured hopper weight (HW) and dividing the difference by N. This new per coin weight (CW) is then stored (S49) in variable memory 110 and the calibration process returns indicating a successful hopper calibration.

Figure 7:
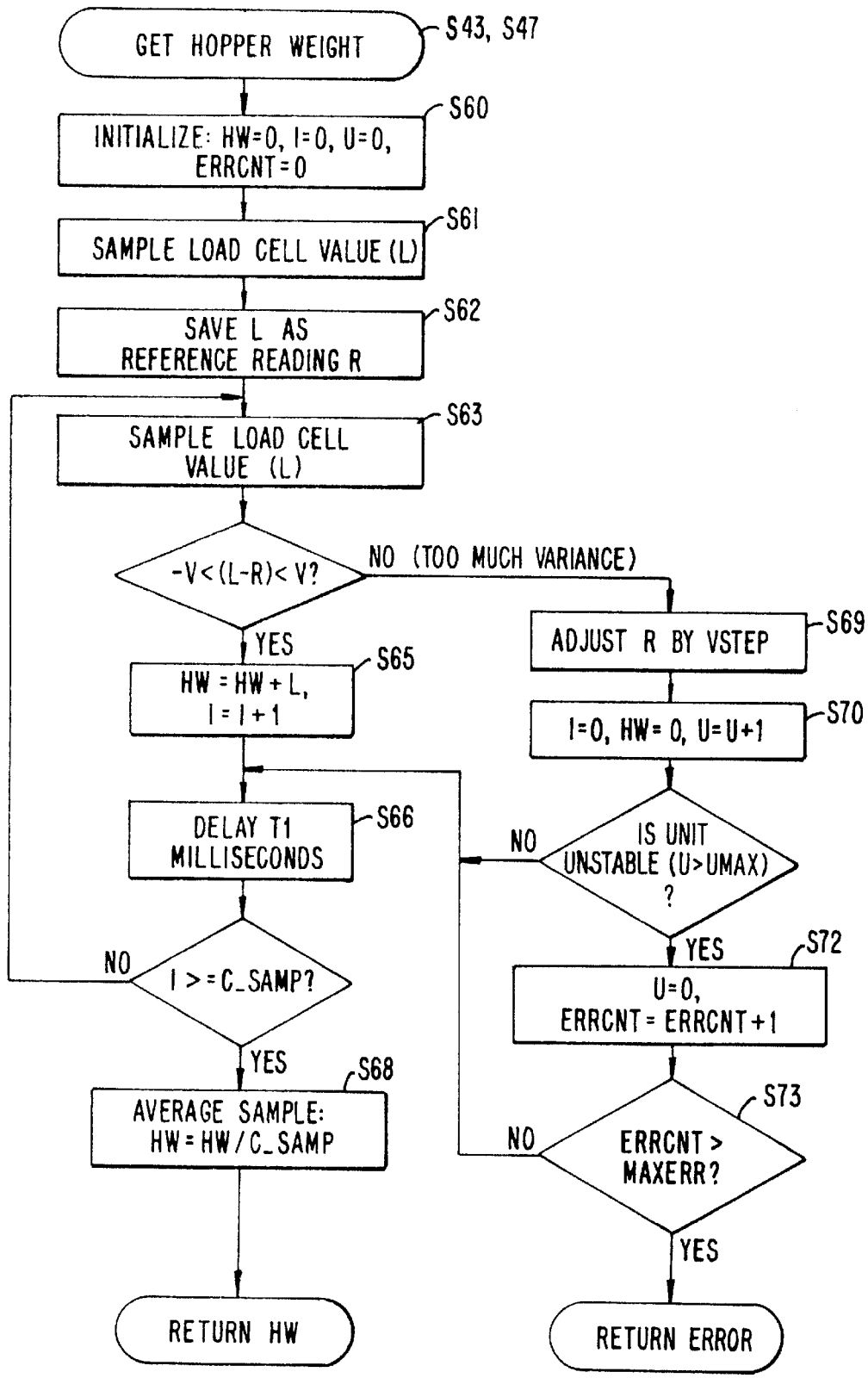
FIG. 7 is a flowchart of a process for obtaining an accurate hopper weight during calibration in the presence of noise and/or vibrations.

FIG. 7 shows the process of getting a hopper weight, the result being either returning successfully with a hopper weight (HW) or returning an error indicating that the hopper was too unstable for a measurement to have been taken.

At the beginning of the process, the variables used for temporary storage and loop control are initialized (S60) and a sampled digital value, L, is taken from load cell 12 (S61). As should be apparent from this description, the processes of FIGS. 4–8 are equally applicable to coin accounting using a drop box, with the main difference being that load cell 12(a) is sampled instead of load cell 12. The sampled value L is stored as a reference reading R (S62), and a main loop is entered.

In the main loop, the load cell is again sampled (S63) to obtain a new value for L. If the absolute value of the difference between L and the reference reading R is less than a variance limit, V, then the sampled value L is added to an accumulator (HW) and a loop counter (I) is incremented (S65). CPU 106 then pauses for a predetermined delay period of T1 ms (S66) and then loops back to step S63 to take another reading. This continues until a predetermined number, C_SAMP, of readings has been taken. Once C_SAMP samples have been taken and accumulated, the value in the accumulator (HW) is divided by C_SAMP (S68), to yield a hopper weight. In a preferred embodiment, the digital values L and R are integers ranging from zero to 16,383, the variance threshold V is 120, T1 is 100 ms and C_SAMP=40.

If the absolute value of the difference between L and R is greater than or equal to V, indicating too much variance between a sampled weight and a reference weight, the reference weight is adjusted by an increment VSTEP (S69). More specifically, R is adjusted so that the absolute value of the difference between L and R is reduced by VSTEP, i.e., if R is greater than L by more than V, R is reduced by VSTEP and if R is less than L by more than V, R is increased by VSTEP. In a preferred embodiment, VSTEP=10.

Following the adjustment of R, the loop counter (I) and the accumulator (HW) are zeroed (S70) and an unstable reading counter, U, is incremented. If the unstable reading counter U is not greater than a maximum UMAX, then CPU 106 reenters the main loop just before step S66. Otherwise, if U is greater than UMAX, U is reset to zero and an error count (ERRCNT) is incremented (S72). If the error count is greater than a maximum error value (ERRCNT>MAXERR) (S73), the hopper weight process ends and an error indication is returned. Otherwise, CPU 106 reenters the main loop just before step S66. In a preferred embodiment, UMAX=40 and MAXERR=4. Also, in a preferred embodiment, as instability is detected, the operator is provided with an indication, such as a display "UNST", to indicate that instability is being detected, thereby giving the operator the opportunity to eliminate the source of instability while a reading is being taken. Assuming a valid hopper weight reading is obtained, this can be used in the calibration process shown in FIG. 6.

Figure 8:
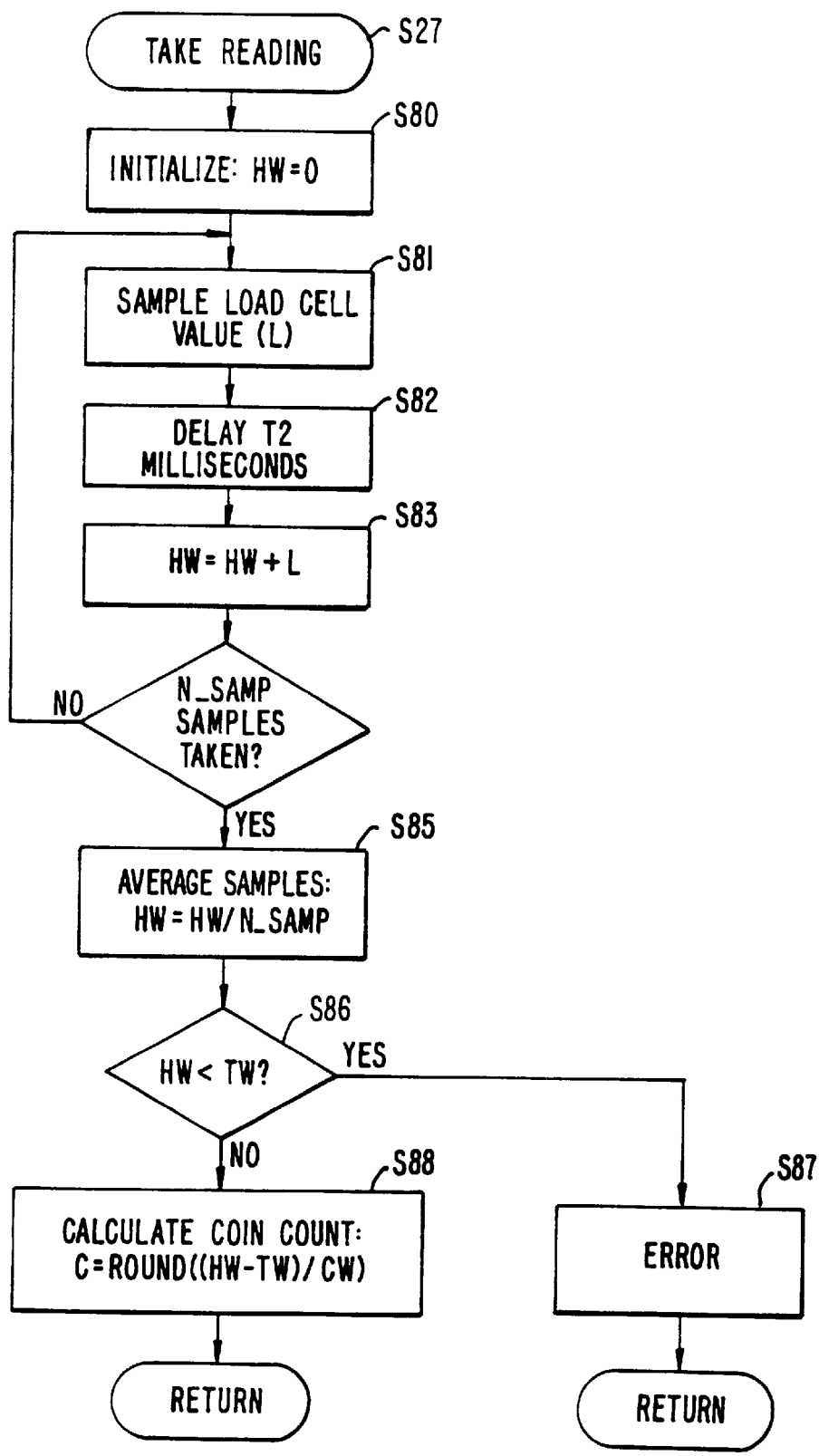
FIG. 8 is a flowchart of a process for obtaining an accurate coin count in the presence of noise and/or vibrations.

FIG. 8 shows the process of taking a reading, which results in either a coin count C being returned or an error indication being returned. At the outset of this process an accumulator (HW) and a loop counter (not shown) are initialized (S80). In the main loop (shown as steps S81, S82, S83) a load cell is sampled to obtain a value L, CPU 106 delays for T2 ms, and the sampled value L is added to the accumulator (HW). This loop repeats until N_SAMP samples are taken. In a preferred embodiment, T2 is 200 ms and N_SAMP=30.

Once N_SAMP samples are taken, the accumulator (HW) is divided by N_SAMP (S85) and the resultant hopper weight (HW) is compared to the hopper tare weight (S86). If the hopper weight HW is less than the tare weight TW, an error signal is generated (S87), otherwise a coin count C is calculated (S88) according to the formula:

$$C=ROUND((HW-TW)/CW).$$

Of course, other suitable formulae can be used. The hopper weight reading process of FIG. 8 is less interactive and less error-correcting than the hopper-weight reading process of FIG. 3, since the former generally occurs when the slot machine is not open and an unreliable reading can be discarded without ill effects, whereas the latter process provides tare weight and per coin weights which cannot be as easily discarded.

In summary, a gaming machine with a hopper and a weighing mechanism have been described. The weighing mechanism weighs the coins in the coin hopper and performs a set of calculations to arrive at a value for the number of coins in the hopper. As this weighing mechanism is an electronic system, the coin count can be communicated to a computer, such as a microprocessor, in the slot machine as well as being communicated to a central casino monitoring and security system to effect preventive fills and automatic inventorying. The handling of preventive fills can take many forms. If a casino already has a centralized dispatch procedure for dispatching technicians, then central notification of preventive fill alerts (from machines detecting low coin counts/weights) might be preferred. Where the slot machines are not already wired to a network and wiring is problematic, the preventive fill alerts can be sent by wireless link to a central monitor. Where dispatch is not centralized, a light on the slot machine "light tower" or a small LED might be lit at a machine needing a preventive fill. Preferably, the indicator is unobtrusive enough not to be noticed by a customer, but is noticeable to a technician. That way, a technician can make his or her rounds, looking for preventive fill indicators. When one is found, and the machine is inactive, the technician fills the machine on the spot.

Another use of such hoppers in gaming machines is to detect technician fraud wherein a technician removes an unauthorized number of coins while servicing a slot machine. This type of fraud can be detected by weighing the hopper and thus determining the number of coins in the hopper just before a slot machine door is opened for servicing, and repeating the process once the door is closed following the servicing. Taking into account expected additions of coins into the gaming machine and authorized withdrawals of coins from the gaming machine, a discrepancy, or theft amount, can be detected if present. The discrepancy can be noted by a microprocessor within the gaming machine and used to trigger an alarm. The discrepancy can also be reported to the central monitoring and security station which may include a central alarm and/or other triggers to initiate an action to stem the theft of coins. Where the key or other device used to gain entry to a slot machine is specific to a particular technician, the slot machine might also record which key was used for later identification of the individual responsible for the discrepancy. In some embodiments, an electronic key is used for opening the door of the gaming machine and electronic keys are coded for individual technician use.

As explained above, the coin hopper can be used in conjunction with a drop box, where a drop box is a reservoir for coin overflow from the hopper. In order to have a complete accounting of all the coins in the machine, a weighing mechanism might be employed on the drop box as well as the coin hopper. In some environments, it may be necessary to measure acceleration and/or vibration of the coin hopper relative to the gaming machine so that measurement of the weight of the coin hopper can be deferred until the acceleration and/or vibrations are at acceptable levels.

In a specific embodiment, coins in the coin hopper are weighed at the start of a detection period to form a baseline weight, from which a baseline coin count is calculated. To this baseline coin count, a detected number of inserted coins are added and a detected number of authorized withdrawn coins is subtracted to arrive at an expected coin count. At the end of the detection period, the coins in the hopper are weighed and a final hopper coin count is determined. A discrepancy amount is then determined by subtracting the final coin count from the expected coin count. This discrepancy amount can then be reported as a coin theft amount. If the detection period is coincident with a period in which a technician has access to the gaming machine and the gaming machine has not been played, the coin theft amount can be associated with fraud on the part of the technician. Where the detection period is a period in which the gaming machine is apparently secure and is being played by a player, the discrepancy can be attributed to fraud on the part of the player.

The above description is illustrative and not restrictive. Many variations of the invention will become apparent to those of skill in the art upon review of this disclosure. Merely by way of example, it should be apparent after reading the above description that noncoin disks or tokens, or even bills or scrip could be accounted for as coins are, and that the present invention could be used with other gaming machines or vending machines. It should also be apparent that the data pin system described above can be replaced with a hard-wired slot machine communications network connection, wireless links, optical or RF communications links, or the like. The scope of the invention should, therefore, be determined not with reference to the above description, but instead should be determined with reference to the appended claims along with their full scope of equivalents.

What is claimed is:

1. A method of operating a gaming machine, comprising the steps of:

detecting whether the gaming machine is in use by a player;

weighing coins in a coin hopper of the gaming machine to determine a hopper weight;

calculating a number of coins in the coin hopper based on the hopper weight, resulting in a coin count;

comparing the coin count to a predetermined threshold coin count; and alerting an operator of the gaming machine when the coin count is below the predetermined threshold coin count and the machine is not in use by a player.

2. The method of claim 1, further comprising a step of adding additional coins to the coin hopper when the gaming machine is not in use by a player and the coin count is below the predetermined threshold coin count.

3. A method of coin counting in a gaming establishment having a plurality of gaming machines each comprising a coin hopper, comprising the steps of:

weighing the coin hopper in each of the plurality of gaming machines to determine a plurality of coin hopper weights;

calculating a coin count for each of the coin hoppers using its hopper weight; and transmitting either the coin hopper weight or the coin count from each of the plurality of gaming machines to a central operator system to allow for automated inventorying of coins in each of the plurality of gaming machines and of a total number of coins contained in the plurality of gaming machines.

4. A method of detecting a low coin status in a coin hopper in a gaming machine, comprising the steps of:

monitoring the coin hopper for stability;

weighing the coin hopper to determine a hopper weight;

calculating a coin count for the hopper using its hopper weight; and signaling an operator when the coin count is below a threshold coin count.

* * * * *